(12) United States Patent
Wang et al.

(10) Patent No.: US 8,054,648 B2
(45) Date of Patent: Nov. 8, 2011

(54) BATTERY COVER AND PORTABLE ELECTRONIC DEVICE HAVING SAME

(75) Inventors: Yue-Ping Wang, Guangdong (CN); Yu-Ping Lai, Guangdong (CN)

(73) Assignees: Premier Image Technology (China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 388 days.

(21) Appl. No.: 12/432,694

(22) Filed: Apr. 29, 2009

(65) Prior Publication Data

US 2010/0091474 A1 Apr. 15, 2010

(30) Foreign Application Priority Data

Oct. 9, 2008 (CN) .............................. 200810304793

(51) Int. Cl.
H05K 7/02 (2006.01)
H05K 7/04 (2006.01)
(52) U.S. Cl. .................... 361/809; 361/807; 361/810
(58) Field of Classification Search .................. 361/600, 361/679.01, 748, 752, 759, 814, 807–810; 455/130, 347, 348, 351; 340/693.5, 693.7, 693.9; 396/539; 348/374; 429/100
See application file for complete search history.

(56) References Cited

U.S. PATENT DOCUMENTS

| | | | | |
|---|---|---|---|---|
| 3,629,793 A | * | 12/1971 | Ettischer et al. | 439/144 |
| 5,315,336 A | * | 5/1994 | Suzuka et al. | 396/539 |
| 6,218,044 B1 | * | 4/2001 | Suzuka | 429/175 |
| 7,058,295 B2 | * | 6/2006 | Nishiwaki | 396/539 |
| 7,180,754 B2 | * | 2/2007 | Qin et al. | 361/797 |
| 7,892,667 B2 | * | 2/2011 | Huang et al. | 429/96 |
| 7,936,278 B2 | * | 5/2011 | Ahn et al. | 340/693.5 |
| 2003/0152826 A1 | * | 8/2003 | Matsuzawa | 429/100 |
| 2008/0063928 A1 | * | 3/2008 | Lin | 429/97 |

* cited by examiner

Primary Examiner — Hung S Bui
(74) Attorney, Agent, or Firm — Altis Law Group, Inc.

(57) ABSTRACT

A battery cover includes an outer panel, an inner panel, a resilient member and a chassis. The inner panel is disposed on the outer panel. The resilient member is located on the inner panel and includes two elongated arms. Each elongated arm includes a contact at the distal end thereof. The chassis is disposed on the resilient member and the inner panel, and is fastened to the outer panel. The chassis defines two openings configured for the two contacts to extend out correspondingly.

18 Claims, 3 Drawing Sheets

BATTERY COVER AND PORTABLE ELECTRONIC DEVICE HAVING SAME

BACKGROUND

1. Technical Field

The present disclosure relates to a battery cover and a portable electronic device having the same.

2. Description of Related Art

Portable electronic devices typically include a battery compartment for receiving batteries and a battery cover for covering the battery compartment, thereby securing the batteries to the electronic devices. The battery cover usually includes a chassis and a resilient member riveted on the chassis to provide electric contact points with the batteries. One of the challenges of utilizing such a battery cover is when the portable electronic device suffers a violent shock, the resilient member bears a risk of detaching away from the chassis, which leads to a damage to the battery cover.

Therefore, it is desirable to provide a battery cover and a portable electronic device having the same which can overcome the described limitations.

DETAILED DESCRIPTION

Embodiments of the disclosure will now be described in detail with reference to the drawings.

Figure 1:
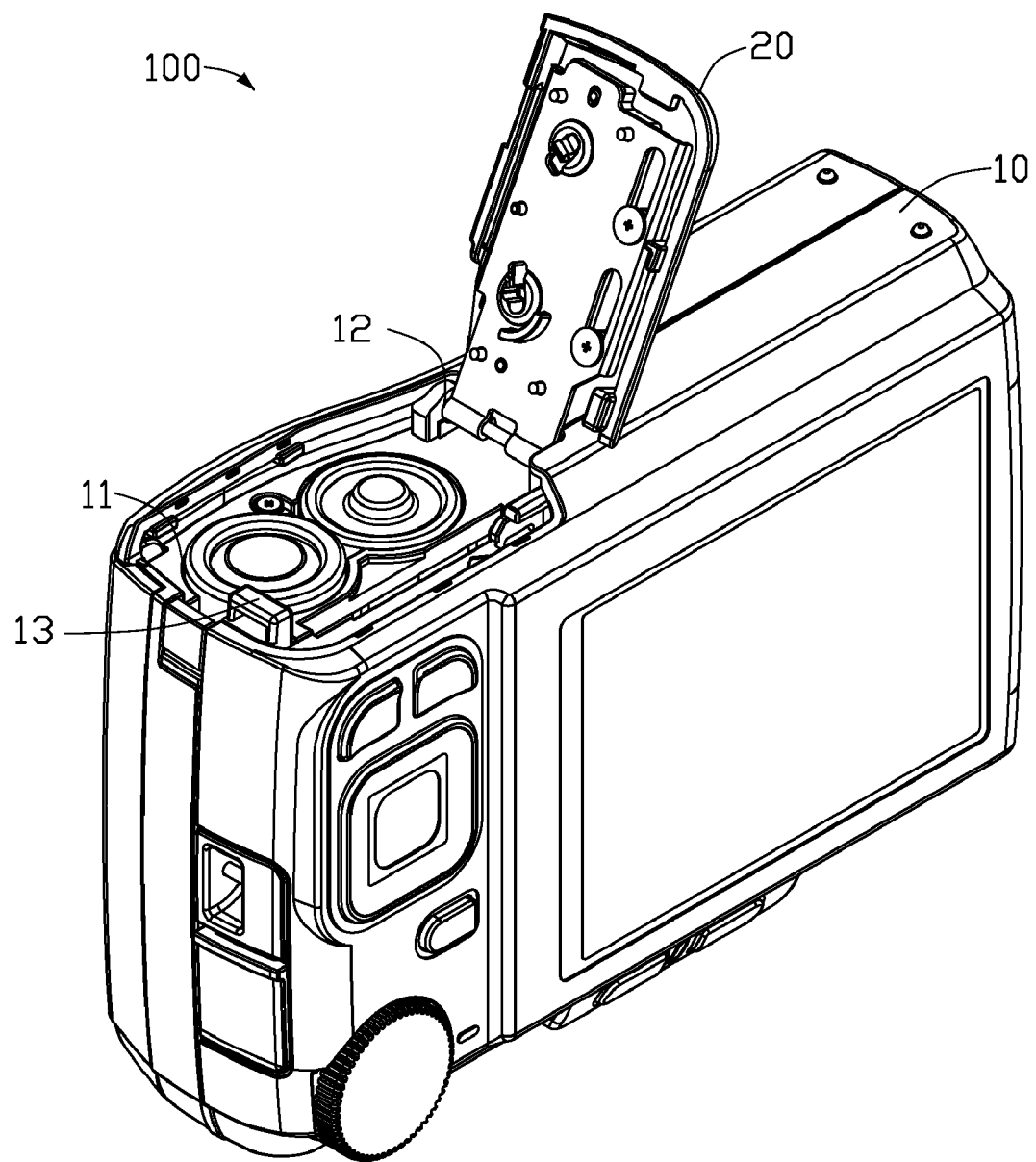
FIG. 1 is an isometric, schematic view of a portable electronic device according to an exemplary embodiment.

Referring to FIG. 1, a portable electronic device 100 in accordance with an exemplary embodiment includes a body 10 and a battery cover 20 rotatably connected with the body 10. In this embodiment, the portable electronic device 100 is a digital still camera, although any other portable electronic device such as a music player sold under the trademark WALKMAN™ is equally applicable while remaining well within the scope of the disclosure.

The body 10 includes a battery compartment 11 at the bottom and defines a pair of pivot holes 12 at one edge of the battery compartment 11. The battery compartment 11 defines two battery housings for receiving two batteries (not labeled) correspondingly. In this embodiment, the battery compartment 11 is configured for receiving two dry cell batteries, which are cylindrical and have a metal cap and a metal bottom at opposite ends. The body 10 further includes a catch 13 formed at another edge of the battery compartment 11 opposite to the pivot holes 12. The catch 13 is configured for latching the battery cover 20.

Figure 2:
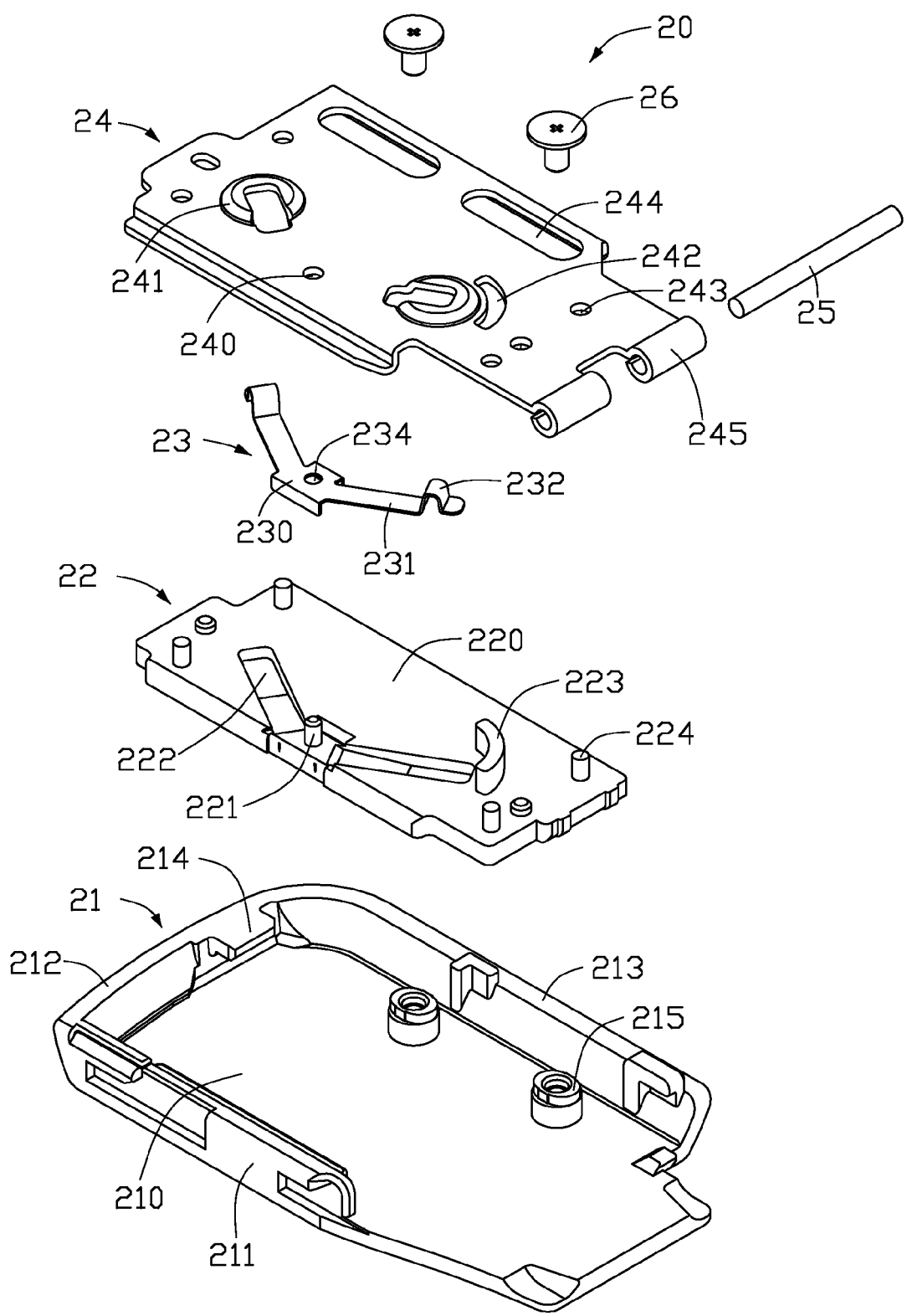
FIG. 2 is an isometric, exploded, schematic view of a battery cover of the portable electronic device of FIG. 1.

Referring to FIG. 2, the battery cover 20 includes a outer panel 21, a inner panel 22, a resilient member 23, a chassis 24, a pivot shaft 25, and two screws 26.

The outer panel 21 includes a bottom surface 210, a first side wall 211, a second side wall 212, a third side wall 213, a locking member 214 and two screw holders 215. The first to third side walls 211, 212 and 213 extend from the edge of the bottom surface 210 to form a housing (not labeled). The second side wall 212 connects the first side wall 211 and the third side wall 213. The locking member 214 extends from the inside surface of the second side wall 212 parallel to the bottom surface 210. The two screw holders 215 are fixed on the bottom surface 210 and configured for receiving the two screws 26 correspondingly.

The inner panel 22 includes a main body 220 and a first positioning member 221 fixed on the main body 220. The positioning member 221 is configured for positioning the resilient member 23. The main body 220 defines two receiving grooves 222 beside the first positioning member 221. The inner panel 22 further includes a curved safety member 223 and four second positioning members 224 extending from the main body 220. The safety member 223 is adjacent to one end of one of the two receiving grooves 222 opposite to the first positioning member 221, and is configured for detecting whether a battery is inserted upside down. The safety member 223 is insulated and has a protruding height perpendicular to the main body 220 and shorter than the protruding height of the metal cap of a battery. The four second positioning members 224 correspondingly extend out of the four corners of the main body 220, and are configured for positioning the chassis 24 relative to the inner panel 22. In this embodiment, the first positioning member 221 and the four second positioning members 224 are made of thermoplastic materials.

The resilient member 23 is electrically conductive and includes a central portion 230 and two elongated arms 231. The central portion 230 defines a central through hole 234, which is shaped to be sleeved on the first positioning member 221. The two elongated arms 231 extend from opposite sides of the central portion 230. Each arm 231 includes a U-bend contact 232 at the distal end. Each U-bend contact 232 is configured to flexibly contact with an electrode of a corresponding battery.

The chassis 24 defines a first positioning through hole 240, two openings 241, a curved slot 242, four second positioning through holes 243 and two sliding slots 244 therein. The first positioning hole 240 corresponds to the first positioning member 221, and is configured for receiving the first positioning member 221. Each opening 241 corresponds to a U-bend contact 232 and is configured for the U-bend contact 232 to extend out. The curved slot 242 surrounds an opening 241, and is shaped to be sleeved on the safety member 223. Each second positioning hole 243 corresponds to a second positioning member 224, and is configured for receiving the second positioning member 224. The sliding slots 244 are strip-shaped to allow a screw 26 to inserted therethrough. The chassis 24 further includes a knuckle 245 configured for receiving the pivot shaft 25. The knuckle 245 is fixed at one end of the chassis 24.

Figure 3:
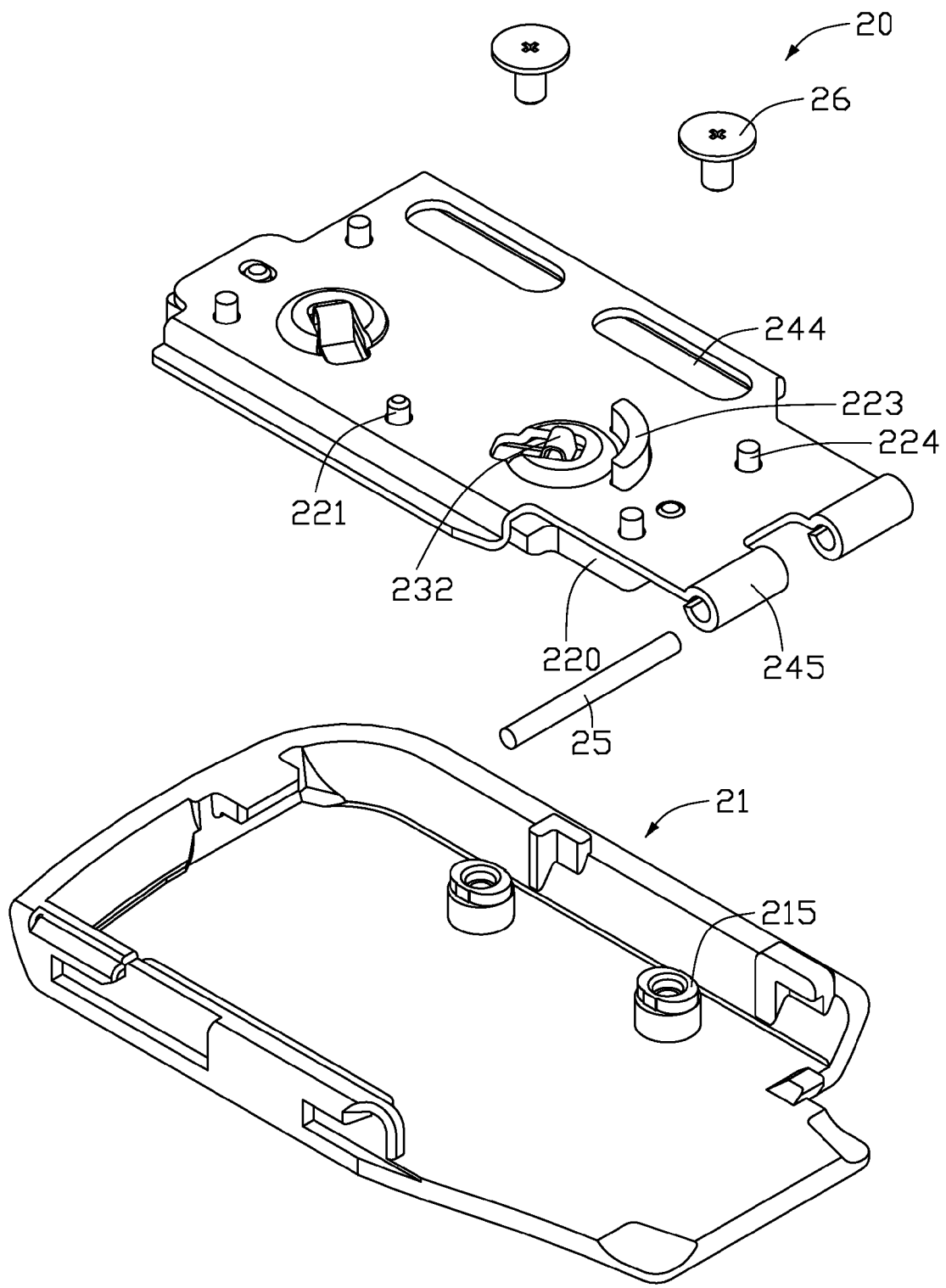
FIG. 3 is a partially assembled view of the battery cover of FIG. 2.

Referring to FIGS. 1-3, in assembly, the positioning member 221 is inserted through the central through hole 234. The elongated arms 231 extend in the receiving grooves 222 correspondingly. The chassis 24 is disposed on the inner panel 22 and the resilient member 23. Accordingly, the first positioning member 221, the U-bend contacts 232, the safety member 223 and the second positioning members 224 are correspondingly inserted through the first positioning hole 240, the openings 241, the curved slot 242 and the second positioning holes 243. Then, the first positioning member 221 and the second positioning members 224 are thermally deformed to couple the inner panel 22, the resilient member 23 and the chassis 24. The screws 26 are slidably inserted through the sliding slots 244 and engaged in the screw holders 215 correspondingly. As a result, the inner panel 22, the resilient member 23 and the chassis 24 are slidably coupled relative to the housing of the outer panel 21. The pivot shaft 25 is inserted through the knuckle 245, and then two opposite end of the pivot shaft 25 are inserted into the pivot holes 12 correspondingly. Thereby, the battery cover 20 is rotatably connected with the body 10.

Referring to FIGS. 1 and 2, in use, two batteries are inserted into the battery compartment 11, and then the battery cover 20 is rotated to enclose the batteries. The outer panel 21 is pushed away from the pivot shaft 25 to align the locking member 214 with the catch 13. Then, the outer panel 21 is pushed back to insert the locking member 214 into the catch 13 such that the battery cover 20 is latched on the body 10. If the metal bottoms of the two batteries both face the battery cover 20 (i.e., one of the two batteries is installed upside down), the metal bottom of a battery would abut the safety member 223. Accordingly, the battery cover 20 would be abutted by the battery when closing the battery cover 20, which indicates that a battery is incorrectly installed.

It should be mentioned that the battery cover 20 is not limited to be rotatably connected with the body 10. Other alternative techniques can be used too.

It should be also mentioned that the inner panel 22, the resilient member 23 and the chassis 24 are not limited to be slidably coupled relative to the housing of the outer panel 21. In an alternative embodiment, they can be fixed in the housing of the outer panel 21, while the outer panel 21 can be latched to the body 10 by an elastic clamp (not shown).

It should be understood that the second positioning members 224 are for interconnecting the inner panel 22 and the chassis 24. In other embodiments, they can be replaced by screws, or be omitted if the first positioning member 221 is strong enough to provide a reliable connection between the inner panel 22 and the chassis 24.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of arrangement of parts within the principles of the invention to the full extent indicated by the broad general meaning of the terms in which the appended claims are expressed.

What is claimed is:

1. A battery cover comprising:
   a outer panel;
   a inner panel disposed on the outer panel;
   a resilient member located on the inner panel and comprising two elongated arms each comprising a contact at the distal end thereof; and
   a chassis disposed on the resilient member and the inner panel and fastened to the outer panel; the chassis defining two openings configured for the two contacts to extend out correspondingly.

2. The battery cover as claimed in claim 1, wherein the inner panel defines two receiving grooves therein to receive the two elongated arms correspondingly.

3. The battery cover as claimed in claim 2, wherein the inner panel further comprises a safety member located around one end of one of the two receiving grooves and configured for detecting whether a battery is installed upside down; the chassis defines a slot to let the safety member extend out.

4. The battery cover as claimed in claim 1, wherein the inner panel further comprises a first positioning member; the resilient member comprises a central portion defining a central through hole which is sleeved on the first positioning member.

5. The battery cover as claimed in claim 4, wherein the first positioning member is made of thermoplastic material.

6. The battery cover as claimed in claim 1, wherein the inner panel further comprises a plurality of second positioning members configured for interconnecting the inner panel and the chassis; the chassis defines a plurality of second positioning through holes therein which are correspondingly sleeved on the second positioning members.

7. The battery cover as claimed in claim 6, wherein the plurality of second positioning members are made of thermoplastic material.

8. The battery cover as claimed in claim 1, further comprising two screws, wherein the outer panel comprises two screw holders corresponding to the two screws; the chassis defines two sliding slots therein; each screw is slidably inserted through a corresponding sliding slot and then engaged in a corresponding screw holder such that the inner panel, the resilient member and the chassis are slidably coupled relative to the outer panel.

9. A portable electronic device comprising:
   a body comprising a battery compartment configured for receiving batteries; and
   a battery cover movably connected to one edge of the battery compartment and configured for enclosing the batteries together with the compartment, comprising:
   a outer panel;
   a inner panel disposed on the outer panel;
   a resilient member located on the inner panel and comprising two elongated arms each comprising a contact at the distal end thereof; and
   a chassis disposed on the resilient member and the inner panel and fastened to the outer panel; the chassis defining two openings configured for the two contacts to extend out correspondingly.

10. The portable electronic device as claimed in claim 9, wherein the body defines two pivot holes at the edge of the battery compartment to which the battery cover is connected; the battery cover further comprises a pivot shaft; the chassis further comprises a knuckle corresponding to the pivot shaft; the pivot shaft is inserted through the knuckle, and two opposite ends of the pivot shaft are inserted into the two pivot holes correspondingly such that the battery cover is rotatably connected with body.

11. The portable electronic device as claimed in claim 9, wherein the body comprises a catch formed at another edge of the battery compartment opposite to the pivot holes; the outer panel comprises a locking member configured for being inserted into the catch to latch the battery cover to the body.

12. The portable electronic device as claimed in claim 9, wherein the inner panel defines two receiving grooves therein to receive the two elongated arms correspondingly.

13. The portable electronic device as claimed in claim 12, wherein the inner panel further comprises a safety member located around one end of one of the two receiving grooves and configured for detecting whether a battery is installed upside down; the chassis defines a slot therein to let the safety member extend out.

14. The portable electronic device as claimed in claim 9, wherein the inner panel further comprises a first positioning member; the resilient member comprises a central portion defining a central through hole therein which is sleeved on the first positioning member.

15. The portable electronic device as claimed in claim 14, wherein the first positioning member is made of thermoplastic material.

16. The portable electronic device as claimed in claim 9, wherein the inner panel further comprises a plurality of second positioning members configured for interconnecting the inner panel and the chassis; the chassis defines a plurality of second positioning through holes therein which are correspondingly sleeved on the second positioning members.

17. The portable electronic device as claimed in claim 16, wherein the second positioning members are made of thermoplastic material.

18. The portable electronic device as claimed in claim 9, wherein the battery cover further comprises two screws; the outer panel comprises two screw holders corresponding to the two screws; the chassis defines two sliding slots therein; each screw is slidably inserted through a corresponding sliding slot and then engaged in a corresponding screw holder such that the inner panel, the resilient member and the chassis are slidably coupled relative to the outer panel.

* * * * *